(12) United States Patent
Oesterlein

(10) Patent No.: US 8,575,781 B2
(45) Date of Patent: Nov. 5, 2013

(54) PHOTOVOLTAIC INVERTER WITH OPTION FOR SWITCHING BETWEEN A POWER SUPPLY SYSTEM WITH A FIXED FREQUENCY AND A LOAD VARIABLE FREQUENCY

(75) Inventor: Marco Oesterlein, Schwelm (DE)

(73) Assignee: Kostal Industrie Elektrik GmbH, Luedenscheid (DE)

( * ) Notice: Subject to any disclaimer, the term of this patent is extended or adjusted under 35 U.S.C. 154(b) by 880 days.

(21) Appl. No.: 12/757,166

(22) Filed: Apr. 9, 2010

(65) Prior Publication Data

US 2010/0220508 A1    Sep. 2, 2010

Related U.S. Application Data

(63) Continuation-in-part of application No. PCT/EP2008/064687, filed on Oct. 29, 2008.

(30) Foreign Application Priority Data

Oct. 31, 2007    (DE) .......................... 10 2007 052 301

(51) Int. Cl.
*H02J 1/00*    (2006.01)
(52) U.S. Cl.
USPC ........................................................ 307/73

(58) Field of Classification Search
USPC ............................................................ 307/73
See application file for complete search history.

(56) References Cited

U.S. PATENT DOCUMENTS

| | | | |
|---|---|---|---|
| 6,969,969 B2 * | 11/2005 | Weinmann | 318/811 |
| 7,190,597 B2 * | 3/2007 | Saren | 363/35 |
| 7,924,582 B2 * | 4/2011 | Muller et al. | 363/56.05 |
| 8,203,070 B2 * | 6/2012 | Homyk et al. | 136/246 |

FOREIGN PATENT DOCUMENTS

DE    19937410 A1    2/2001

* cited by examiner

*Primary Examiner* — Hal Kaplan
(74) *Attorney, Agent, or Firm* — Brooks Kushman P.C.

(57) ABSTRACT

A photovoltaic inverter having an inverter bridge section, a first output, a second output, and a power switch. The inverter bridge section is operable for converting DC electrical energy into AC electrical energy. The inverter bridge section has an output for outputting the AC electrical energy. The power switch is connected to the output of the inverter bridge section, the first output, and the second output. The power switch is selectively switchable between a first state in which the output of the inverter bridge section is connected to the first output via the power switch and a second state in which the output of the inverter bridge section is connected to the second output via the power switch.

14 Claims, 1 Drawing Sheet

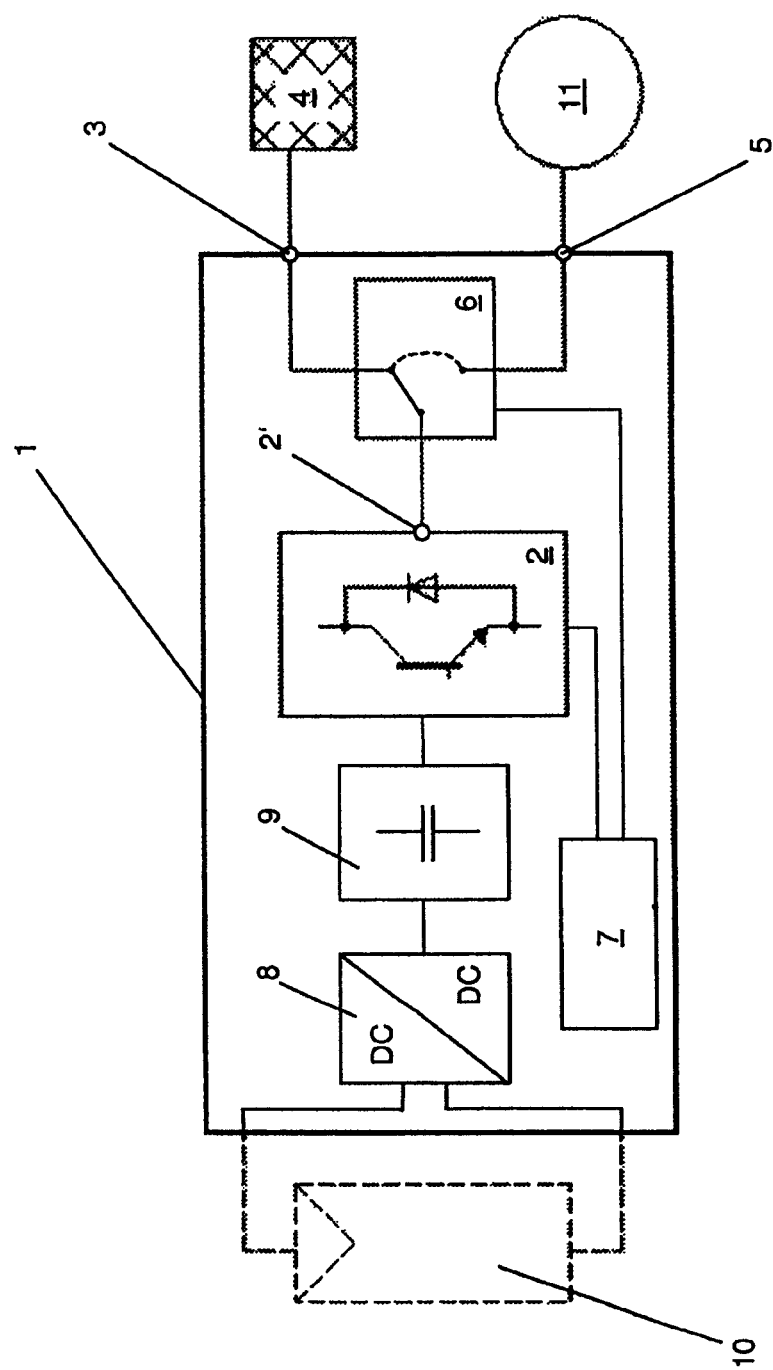

PHOTOVOLTAIC INVERTER WITH OPTION FOR SWITCHING BETWEEN A POWER SUPPLY SYSTEM WITH A FIXED FREQUENCY AND A LOAD VARIABLE FREQUENCY

CROSS-REFERENCE TO RELATED APPLICATIONS

This application is a continuation-in-part of International Application No. PCT/EP2008/064687, published in German, with an international filing date of Oct. 29, 2008, which claims priority to DE 10 2007 052 301.9, filed Oct. 31, 2007; the disclosures of which are both hereby incorporated by reference.

TECHNICAL FIELD

The present invention relates to a photovoltaic inverter having an inverter bridge section and an output in which the output is connectable to a power network for supplying electric energy in the form of an AC voltage having a fixed frequency from the inverter bridge section to the power network.

BACKGROUND

An inverter has an inverter bridge section for converting direct current (DC) electric energy into alternating current (AC) electric energy. The inverter bridge section receives DC electric energy, converts the DC electric energy into AC electric energy having a voltage at a fixed frequency (e.g., 50 or 60 Hz), and outputs the AC electric energy to a load. An inverter may have one, two, or three inverter bridge sections to thereby output a one, two, or three phase AC voltage having a fixed frequency. The AC voltage may be fed through an output of the inverter unit into a power network. The power network may be a local or public power network.

A photovoltaic or solar inverter has an input for receiving the DC electric energy from an array of photovoltaic elements (i.e., solar cells). The solar cells are held in a position to receive energy from the sun during the daytime. In order to increase the energy yield, the solar cells may be moved by mechanical tracking devices as a function of the changing position of the sun throughout the day. The mechanical tracking devices are driven by electric motors which are supplied with energy from the power network.

DE 199 37 410 A1 describes a solar inverter having three inverter bridge sections for producing a three-phase alternating current.

SUMMARY

An object of the present invention includes a photovoltaic or solar inverter having at least one bridge path (i.e., at least one inverter bridge section), a first output for feeding electrical energy in the form of an AC voltage at a fixed frequency from the bridge path into a power network, a second output for feeding electrical energy in the form of an AC voltage at a variable frequency from the bridge path into an electric motor operable for driving a mechanical tracking device associated with solar cells associated with the inverter, and a circuit-breaker (i.e., a power switch), wherein the circuit-breaker can be used to connect the bridge path either to the first output or to the second output.

In carrying out the above object and other objects, the present invention provides a photovoltaic inverter having an inverter bridge section, a first output, a second output, and a power switch. The inverter bridge section is operable for converting DC electrical energy into AC electrical energy. The inverter bridge section has an output for outputting the AC electrical energy. The power switch is connected to the output of the inverter bridge section, the first output, and the second output. The power switch is selectively switchable between a first state in which the output of the inverter bridge section is connected to the first output via the power switch and a second state in which the output of the inverter bridge section is connected to the second output via the power switch.

A photovoltaic or solar inverter in accordance with embodiments of the present invention is capable of selectively feeding AC electrical energy into either a power network or a local load at a given time. The inverter includes an inverter bridge section, first and second outputs, and a power switch. The inverter bridge section includes an input and an output. The inverter receives DC electrical energy from photovoltaic elements (i.e., solar cells) and provides the DC electrical energy to the input of the inverter bridge section. The inverter bridge section converts the DC electrical energy into AC electrical energy and produces the AC electrical energy at the output of the inverter bridge section. The output of the inverter bridge section is connected to the power switch and the power switch is connected to the first and second outputs. The power switch is operable to selectively switch between a first state in which the output of the inverter bridge section is connected to the first output and a second state in which the output of the inverter bridge section is connected to the second output. The first output is connected to a local or public power network and the second output is connected to a local load such as an electric motor. The motor is operable for driving a mechanical tracking device associated with the solar cells. The motor drives the mechanical tracking device to move the orientation of the solar cells as a function of the changing position of the sun during the day.

The inverter further includes a controller operable with the power switch for switching the switch between the first and second states. In the first state, the output of the inverter bridge section is connected to the first output whereby AC electrical energy at a fixed frequency is provided from the inverter bridge section to the power network. In the second state, the output of the inverter bridge section is connected to the second output whereby AC electrical energy at a variable frequency is provided from the inverter bridge section to the motor for the motor to be driven to drive the mechanical tracking device. The controller is operable with the inverter bridge section to control the inverter bridge section to achieve a desired frequency response in order for the inverter bridge section to provide the AC electrical energy at the variable frequency. The inverter is thereby suited for directly supplying electric motors with electrical energy, especially for asynchronous machines.

In accordance with embodiments of the present invention, the inverter may include more than one inverter bridge section. In this case, the inverter may include a power switch for each inverter bridge section. The controller is operable with the power switches for connecting the respective inverter bridge sections to the first and second outputs of the inverter. The controller is operable with the inverter bridge sections for controlling the inverter bridge sections to achieve a desired frequency response in order for the inverter bridge sections to provide AC electrical energy at a variable frequency. Multiple inverter bridge sections enable the inverter to output multiple phase AC electrical energy. For instance, if the inverter has a single inverter bridge section, then the inverter can produce one-phase AC electrical energy; if the inverter has two inverter bridge sections, then the inverter can produce two-phase AC electrical energy; and if the inverter has three inverter bridge sections, then the inverter can produce three-phase AC electrical energy.

BRIEF DESCRIPTION OF THE DRAWINGS

The FIGURE illustrates a block diagram of a photovoltaic or solar inverter in accordance with an embodiment of the present invention.

DETAILED DESCRIPTION

As required, detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to the FIGURE, a block diagram of a photovoltaic or solar inverter 1 in accordance with an embodiment of the present invention is shown. Inverter 1 includes an input side and an output side. Inverter 1 converts direct current (DC) electric energy received at the input side of inverter 1 into alternating current (AC) electric energy. Inverter 1 outputs the AC electric energy via the output side of inverter 1 to one or more loads.

Proceeding from the input side toward the output side of inverter 1, inverter 1 includes a direct current to direct current (DC/DC) converter 8, a DC intermediate circuit 9, at least one inverter bridge section 2 each having an output 2', and at least one power switch 6. Inverter 1 further includes a controller 7 such as a micro-processor for controlling the operation of each inverter bridge section 2 and each power switch 6. The output side of inverter 1 includes a first output 3 and a second output 5.

A plurality of photovoltaic elements (i.e., solar cells) 10 are associated with the input side of inverter 1. A local or public power network 4 is associated with first output 3 of the output side of inverter 1. An electric motor 11 is associated with second output 5 of the output side of inverter 1.

Solar cells 10 are connected to one another in series in so-called strings and are arranged to receive sunlight from the sun. Solar cells 10 convert the received sunlight into DC electric energy (e.g., a DC voltage). Solar cells 10 are connected to the input side of inverter 1 for supplying inverter 1 with the DC voltage. In particular, solar cells 10 are connected to DC/DC converter 8 of inverter 1 for supplying DC/DC converter 8 with the DC voltage.

DC/DC converter 8 converts the DC voltage from solar cells 10 into an output DC voltage. That is, DC/DC converter 8 carries out matching of the DC voltage from solar cells 10 to a voltage required at the output side of inverter 1. DC/DC converter 8 provides the output DC voltage to DC intermediate circuit 9 of inverter 1. DC intermediate circuit 9 is a device made of a plurality of condensors for energy storage or buffering. DC intermediate circuit 9 provides an output DC voltage based on the output DC voltage from DC/DC converter 8.

DC intermediate circuit 9 is connected to the input of each inverter bridge section 2 of inverter 1. Each inverter bridge section 2 is shown in the FIGURE as having a half-bridge arrangement with two controllable semiconductor switches. The input of each inverter bridge section 2 is fed by DC intermediate circuit 9 with the output DC voltage provided by DC intermediate circuit 9. Each inverter bridge section 2 converts the output DC voltage provided by DC intermediate circuit into an AC output voltage for output at output 2' of the inverter bridge section 2.

If inverter 1 is to only produce single-phase AC electrical energy at its output side, then inverter 1 can have a single inverter bridge section 2 as shown in the FIGURE. If inverter 1 is to be capable of producing three-phase AC electrical energy, then inverter 1 has three inverter bridge sections 2 in parallel to one another.

Output 2' of each inverter bridge section 2 is connected to a respective power switch 6 of inverter 1. For example, if inverter 1 has three inverter bridge sections 2, then inverter 1 includes three power switches 6. In this example, output 2' of first inverter bridge section 2 is connected to first power switch 6, output 2' of second inverter bridge section 2 is connected to second power switch 6, and output 2' of third inverter bridge section 2 is connected to third power switch 6.

Output 2' of each inverter bridge section 2 can be connected via its respective power switch 6 to either first output 3 or second output 5 of inverter 1. For instance, in the example above with three inverter bridge sections 2, output 2' of first inverter bridge section 2 can be connected via first power switch 6 to either first output 3 or second output 5 of inverter 1, output 2' of second inverter bridge section 2 can be connected via second power switch 6 to either first output 3 or second output 5 of inverter 1, and output 2' of third inverter bridge section 2 can be connected via third power switch to either first output 3 or second output 5 of inverter 1.

Controller 7 controls the operation of each inverter bridge section 2 and each power switch 6. For example, controller 7 controls each inverter bridge section 2 to convert DC electrical energy from DC intermediate circuit 9 into AC electrical energy for output at output 2' of the inverter bridge section 2. Controller 7 also controls each power switch 6 to connect output 2' of the associated inverter bridge section 2 to either first output 3 or second output 5 of inverter 1.

Each power switch 6 is, for example, a relay or a semiconductor switch designed as a change over switch. Controller 7 provides a respective electric control current to each power switch 6 whereby the power switch undertakes to change over the load current path to either first output 3 or second output 5 of inverter 1.

First output 3 of inverter 1 serves to connect the output side of inverter 1 to power network 4. More particularly, first output 3 serves to connect output 2' of each inverter bridge section 2 to power network 4 for power network 4 to receive AC electrical energy from inverter 1. When output 2' of each inverter bridge section 2 is connected via a respective power switch 6 to first output 3, the AC electrical energy from each inverter bridge section 2 is supplied to power network 4. The AC electrical energy supplied to power network 4 is in the form of an alternating current having a fixed frequency.

Second output 5 of inverter 1 serves to connect the output side of inverter 1 to electric motor 11. More particularly, second output 4 serves to connect output 2' of each inverter bridge section 2 to motor 11 for motor 11 to receive AC electrical energy from inverter 1. Motor 11 is an asynchronous motor or the like for driving mechanical tracking devices operable for moving solar cells 10. Such mechanical tracking devices move (i.e., orientate) solar cells 10 as a function of the changing position of the sun throughout the day in order to increase the energy yield of solar cells 10. As a result, the orientation of solar cells 10 can be controlled directly from inverter 1 as the energy for driving the mechanical tracking devices is supplied by inverter 1. When output 2' of each inverter bridge section 2 is connected via a respective power switch 6 to second output 5, the AC electrical energy from each inverter bridge section 2 is supplied to motor 11. The AC electrical energy supplied to motor 11 is in the form of an alternating current having a variable frequency. Controller 7 controls each inverter bridge section 2 to achieve the desired frequency response.

As described above, in addition to controlling each inverter bridge section 2, controller 7 controls each power switch 6 connected downstream on the output side to select the respectively active first output 3 or second output 5. As a result, in the case of inverter 1 having a plurality of inverter bridge sections 2, one or more of inverter bridge sections 2 may be connected with power network 4 via first output 3 for feeding power network 4 with electrical energy in the form of an AC voltage at a fixed frequency while one or more other ones of inverter bridge sections 2 may be connected with motor 11 via second output 5 for feeding motor 11 with electrical energy in the form of variable frequency AC voltages in order to control motor 11.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A photovoltaic inverter comprising:
   an inverter bridge section operable for converting DC electrical energy into AC electrical energy, the inverter bridge section having an output for outputting the AC electrical energy;
   a first output;
   a second output;
   a power switch connected to the output of the inverter bridge section, the first output, and the second output; and
   a controller operable for controlling the inverter bridge section to achieve a desired frequency response such that the AC electrical energy output from the inverter bridge section has a variable frequency;
   wherein the power switch is selectively switchable between a first state in which the output of the inverter bridge section is connected to the first output via the power switch and a second state in which the output of the inverter bridge section is connected to the second output via the power switch;
   wherein the inverter bridge section is uncontrolled by the controller when the power switch is in the first state the AC electrical energy output from the inverter bridge section is in the form of an AC voltage with a fixed frequency;
   wherein the inverter bridge section is controlled by the controller when the power switch is in the second state such that the AC electrical energy output from the inverter bridge section is in the form of an AC voltage with a variable frequency.

2. The photovoltaic inverter of claim 1 wherein:
   the first output is connected with a power network, wherein the AC electrical energy from the inverter bridge section is supplied to the power network when the output of the inverter bridge section is connected to the first output via the power switch;
   the second output is connected with an electric motor, wherein the AC electrical energy from the inverter bridge section is supplied to the electric motor when the output of the inverter bridge section is connected to the second output via the power switch.

3. The photovoltaic inverter of claim 2 wherein:
   the DC electrical energy is from a solar cell.

4. The photovoltaic inverter of claim 3 wherein:
   the electric motor is operable for driving a mechanical tracking device operable for moving the solar cell upon the electric motor receiving the AC electrical energy from the inverter bridge section when the output of the inverter bridge section is connected to the second output via the power switch.

5. The photovoltaic inverter of claim 1 wherein the inverter bridge section is a first inverter bridge section, the photovoltaic inverter further comprising:
   a second inverter bridge section operable for converting the DC electrical energy into AC electrical energy, the second inverter bridge section having an output for outputting the AC electrical energy.

6. The photovoltaic inverter of claim 5 wherein:
   the power switch is further connected to the output of the second inverter bridge section, wherein the power switch is selectively switchable between the first state in which the outputs of the first and second inverter bridge sections are connected to the first output via the power switch and the second state in which the outputs of the first and second inverter bridge sections are connected to the second output via the power switch.

7. The photovoltaic inverter of claim 5 wherein the power switch is a first power switch, the photovoltaic inverter further comprising:
   a second power switch connected between the output of the second inverter bridge section, the first output, and the second output;
   wherein the second power switch is selectively switchable between a first state in which the output of the second inverter bridge section is connected to the first output via the second power switch and a second state in which the output of the second inverter bridge section is connected to the second output via the second power switch.

8. The photovoltaic inverter of claim 5 further comprising:
   a third inverter bridge section operable for converting the DC electrical energy into AC electrical energy, the third inverter bridge section having an output for outputting the AC electrical energy.

9. The photovoltaic inverter of claim 8 wherein:
   the power switch is further connected to the outputs of the second and third inverter bridge sections, wherein the power switch is selectively switchable between the first state in which the outputs of the first, second, and third inverter bridge sections are connected to the first output via the power switch and the second state in which the outputs of the first, second, and third inverter bridge sections are connected to the second output via the power switch.

10. The photovoltaic inverter of claim 8 wherein the power switch is a first power switch, the photovoltaic inverter further comprising:
    a second power switch connected between the output of the second inverter bridge section, the first output, and the second output; and
    a third power switch connected between the output of the third inverter bridge section, the first output, and the second output;

wherein the second power switch is selectively switchable between a first state in which the output of the second inverter bridge section is connected to the first output via the second power switch and a second state in which the output of the second inverter bridge section is connected to the second output via the second power switch;

wherein the third power switch is selectively switchable between a first state in which the output of the third inverter bridge section is connected to the first output via the third power switch and a second state in which the output of the third inverter bridge section is connected to the second output via the third power switch.

11. The photovoltaic inverter of claim 1 further comprising:
a DC/DC converter, wherein the DC/DC converter provides the DC electrical energy to the inverter bridge section for the inverter bridge section to convert into the AC electrical energy.

12. The photovoltaic inverter of claim 1 wherein:
the DC electrical energy is from a solar cell.

13. A photovoltaic inverter comprising:
an inverter bridge section operable for converting DC electrical energy into AC electrical energy, the inverter bridge section having an output for outputting the AC electrical energy;
a first output;
a second output;
a power switch connected to the output of the inverter bridge section, the first output, and the second output; and
a controller operable for controlling the inverter bridge section to achieve a desired frequency response such that the AC electrical energy output from the inverter bridge section has a variable frequency;
wherein the power switch is selectively switchable between a first state in which the output of the inverter bridge section is connected to the first output via the power switch and a second state in which the output of the inverter bridge section is connected to the second output via the power switch;
wherein the first output is connected with a power network, wherein the AC electrical energy from the inverter bridge section is supplied to the power network when the output of the inverter bridge section is connected to the first output via the power switch;
wherein the second output is connected with an electric motor, wherein the AC electrical energy from the inverter bridge section is supplied to the electric motor when the output of the inverter bridge section is connected to the second output via the power switch;
wherein the AC electrical energy output from the inverter bridge section when the inverter bridge section is uncontrolled by the controller is in the form of an AC voltage having a fixed frequency;
wherein the inverter bridge section is uncontrolled by the controller when the power switch is in the first state such that the AC electrical energy supplied from the inverter bridge section to the power network is in the form of an AC voltage with a fixed frequency;
wherein the inverter bridge section is controlled by the controller when the power switch is in the second state such that the AC electrical energy supplied from the inverter bridge section to the electric motor is in the form of an AC voltage with a variable frequency.

14. A photovoltaic inverter system comprising:
a solar cell operable for converting sunlight into DC electrical energy;
an inverter bridge section operable for converting the DC electrical energy from the solar cell into AC electrical energy;
a first output connected to a power network;
a second output connected to a motor operable for moving the solar cell upon receiving AC electrical energy in the form of an AC voltage having a variable frequency;
a power switch connected to the inverter bridge section and the first and second outputs; and
a controller operable for controlling the inverter bridge section to achieve a desired frequency response such that the AC electrical energy from the inverter bridge section has a variable frequency, wherein the AC electrical energy from the inverter bridge section when the inverter bridge section is uncontrolled by the controller is in the form of an AC voltage having a fixed frequency;
wherein the power switch is selectively switchable between a first state in which the output of the inverter bridge section is connected to the first output such that the AC electrical energy from the inverter bridge section is supplied to the power network and a second state in which the output of the inverter bridge section is connected to the second output such that the AC electrical energy from the inverter bridge section is supplied to the electric motor;
wherein the inverter bridge section is uncontrolled by the controller when the power switch is in the first state such that the AC electrical energy supplied from the inverter bridge section to the power network is in the form of an AC voltage with a fixed frequency;
wherein the inverter bridge section is controlled by the controller when the power switch is in the second state such that the AC electrical energy supplied from the inverter bridge section to the motor is in the form of an AC voltage with a variable frequency.

* * * * *